United States Patent
Kuroda et al.

(10) Patent No.: US 9,266,046 B2
(45) Date of Patent: Feb. 23, 2016

(54) MIXED-FIBER NONWOVEN FABRIC, LAMINATED SHEET AND FILTER, AND PROCESS FOR PRODUCING MIXED-FIBER NONWOVEN FABRIC

(71) Applicant: TORAY INDUSTRIES, INC., Tokyo (JP)

(72) Inventors: Akito Kuroda, Otsu (JP); Yuji Iyama, Otsu (JP); Yoshikazu Yakake, Otsu (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 14/364,109

(22) PCT Filed: Dec. 14, 2012

(86) PCT No.: PCT/JP2012/082445
§ 371 (c)(1),
(2) Date: Jun. 10, 2014

(87) PCT Pub. No.: WO2013/089213
PCT Pub. Date: Jun. 20, 2013

(65) Prior Publication Data
US 2014/0305090 A1    Oct. 16, 2014

(30) Foreign Application Priority Data
Dec. 16, 2011   (JP) ................................ 2011-275507

(51) Int. Cl.
*B01D 46/00* (2006.01)
*B01D 39/16* (2006.01)
(Continued)

(52) U.S. Cl.
CPC .............. *B01D 39/163* (2013.01); *B01D 39/16* (2013.01); *B03C 3/28* (2013.01); *D04H 1/4382* (2013.01);
(Continued)

(58) Field of Classification Search
CPC ...... B01D 39/16; B01D 39/20; B01D 39/163; D01D 5/985; D04H 3/16; D04H 1/565

USPC ............. 55/521, 528; 264/103; 442/340–341, 442/346, 351
See application file for complete search history.

(56) References Cited

U.S. PATENT DOCUMENTS

| 5,496,507 A | 3/1996 | Angadjivand et al. |
| 5,511,960 A | 4/1996 | Terakawa et al. |

(Continued)

FOREIGN PATENT DOCUMENTS

| BE | 568985 | 7/1958 |
| DE | 102006013170 | 9/2007 |

(Continued)

OTHER PUBLICATIONS

English translation of the International Preliminary Report on Patentability (IPRP) for International PCT Application No. PCT/JP2012/082445, issued Jun. 17, 2014.

(Continued)

*Primary Examiner* — Jason M Greene
*Assistant Examiner* — Karla Hawkins
(74) *Attorney, Agent, or Firm* — RatnerPrestia

(57) ABSTRACT

Provided are a mixed-fiber nonwoven fabric suitable for air filters and a filter medium using the mixed-fiber nonwoven fabric. The nonwoven fabric includes at least two types of fibers having different melting points, which fibers are low melting point fibers made of a polyolefin resin component A, and high melting point fibers made of a high melting point resin component B having a higher melting point than that of the polyolefin resin component A. The number average fiber diameter of the high melting point fibers is larger than that of the low melting point fibers. At least one high melting point fiber having a fiber diameter of 20 μm to 100 μm is present per 1.00 mm of the length of the cross section of the nonwoven fabric. The number average fiber diameter of all fibers constituting the nonwoven fabric falls within the range of 0.3 μm to 10 μm.

10 Claims, 1 Drawing Sheet

(51) Int. Cl.
- *B03C 3/28* (2006.01)
- *D04H 3/016* (2012.01)
- *D04H 3/153* (2012.01)
- *D04H 3/16* (2006.01)
- *D04H 1/4382* (2012.01)
- *D04H 1/56* (2006.01)
- *D04H 13/00* (2006.01)

(52) U.S. Cl.
CPC ............. *D04H 1/56* (2013.01); *D04H 3/016* (2013.01); *D04H 3/153* (2013.01); *D04H 3/16* (2013.01); *D04H 13/001* (2013.01); *Y10T 442/625* (2015.04); *Y10T 442/626* (2015.04)

(56) References Cited

U.S. PATENT DOCUMENTS

| | | | |
|---|---|---|---|
| 5,783,011 A * | 7/1998 | Barboza et al. | 156/167 |
| 6,230,901 B1 | 5/2001 | Ogata et al. | |
| 6,319,865 B1 | 11/2001 | Mikami | |
| 2002/0056940 A1 | 5/2002 | Rudisill et al. | |
| 2002/0170661 A1 | 11/2002 | Rudisill et al. | |
| 2004/0067710 A1 | 4/2004 | Tsujiyama et al. | |
| 2005/0026526 A1 | 2/2005 | Verdegan | |
| 2008/0022643 A1* | 1/2008 | Fox et al. | 55/521 |
| 2008/0026659 A1 | 1/2008 | Brandner et al. | |
| 2009/0117803 A1 | 5/2009 | Jung et al. | |

FOREIGN PATENT DOCUMENTS

| | | |
|---|---|---|
| EP | 2327823 | 6/2011 |
| JP | 63-280408 | 11/1988 |
| JP | H02-91262 | 3/1990 |
| JP | H02-104765 | 4/1990 |
| JP | H05-263307 A | 10/1993 |
| JP | H06-93551 | 4/1994 |
| JP | H07-082649 A | 3/1995 |
| JP | H09-501604 A | 2/1997 |
| JP | 11-104417 A | 4/1999 |
| JP | H11-131353 A | 5/1999 |
| JP | 2002-201560 | 7/2002 |
| JP | 2002-249978 | 9/2002 |
| JP | 2004-527671 A | 9/2004 |
| JP | 2005-507976 | 3/2005 |
| JP | 2005-111337 A | 4/2005 |
| JP | 2005-171456 | 6/2005 |
| JP | 2006037295 | 2/2006 |
| JP | 2006-112025 | 4/2006 |
| JP | 2007-107126 A | 4/2007 |
| JP | 2009-531554 A | 9/2009 |
| JP | 2009-545440 A | 12/2009 |
| JP | 2009-545682 A | 12/2009 |
| JP | 2010-511488 A | 4/2010 |
| WO | 2009002614 | 12/2008 |

OTHER PUBLICATIONS

International Search Report for International PCT Application No. PCT/JP2012/082445 mailed Feb. 5, 2013.
European Search Report mailed Jul. 30, 2015 in European Application No. 12857461.3.

* cited by examiner

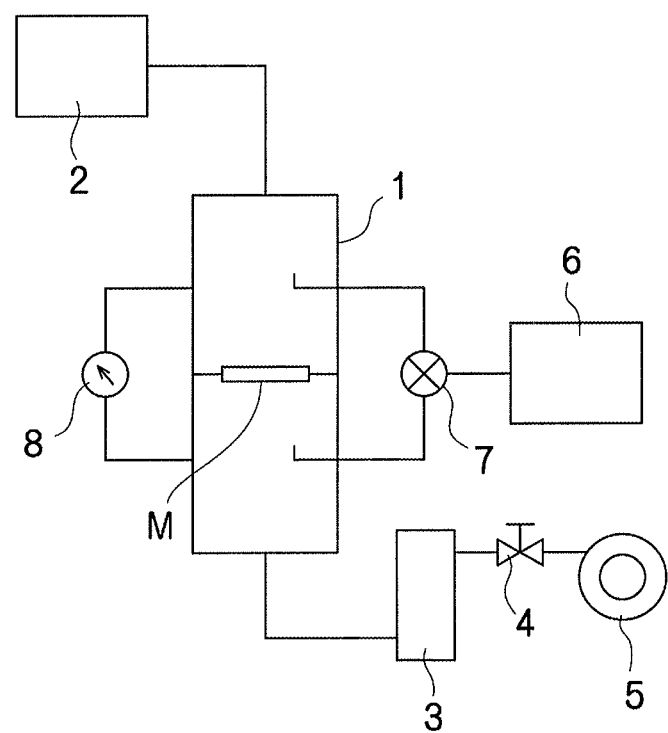

MIXED-FIBER NONWOVEN FABRIC, LAMINATED SHEET AND FILTER, AND PROCESS FOR PRODUCING MIXED-FIBER NONWOVEN FABRIC

CROSS REFERENCE TO RELATED APPLICATIONS

This is the U.S. National Phase application of PCT/JP2012/082445, filed Dec. 14, 2012, which claims priority to Japanese Patent Application No. 2011-275507, filed Dec. 16, 2011, the disclosures of these applications being incorporated herein by reference in their entireties for all purposes.

FIELD OF THE INVENTION

The present invention relates to a mixed-fiber nonwoven fabric comprising fibers having different melting points and being especially suitable as a filter medium for air filters.

BACKGROUND OF THE INVENTION

Increasing health consciousness, due to recent issues of air pollution and infectious disease epidemic, has spurred demands for air cleaners, automotive cabin filters, and the like. These devices employ a common technique, which uses an air filter medium composed of a nonwoven fabric or the like to remove air dust. Such an air filter medium is required to have a high collection efficiency.

A high collection efficiency of a filter medium composed of a nonwoven fabric is known to be achieved via a technique of reducing the diameter of fibers constituting the nonwoven fabric (see Patent Literature 1). However, in this method, as the filtration performance is improved, the pressure drop of the filter medium increases. When the pressure drop increases, energy requirements for air cleaning and filtration increases.

The above problem is widely known to be solved by subjecting the fibers to charge treatment. The charge treatment, also called electret treatment, is an extremely effective means for increasing collection efficiency for microparticles in the air (see Patent Literature 2, 3 and 4). This technique can greatly improve the collection efficiency. However, there has been an increasing need for further reduction of pressure drop of filters and therefore there has been a demand for a technique for achieving a much lower pressure drop.

As such a technique for achieving a much lower pressure drop, proposed are methods using, as a filter medium, a nonwoven fabric comprising a mixture of two or more types of charged fibers having different fiber diameters (see Patent Literature 5, 6 and 7). In addition to the methods using charged fibers, proposed are methods using a combination of fibers having different fiber diameters to improve the filtration performance (see Patent Literature 8 and 9). Among them, Patent Literature 7 describes that a meltblown nonwoven fabric comprising a mixture of microfibers having a fiber diameter of 10 µm or less and larger size fibers having a fiber diameter of more than 10 µm has appropriate sheet formability and breathability for applying to masks or filters.

There are various methods for producing a mixed-fiber meltblown nonwoven fabric comprising a plurality of materials. An example of such a production method of a nonwoven fabric for filters is a method comprising melting one type of fibers to increase the durability of a resulting nonwoven fabric (see Patent Literature 10). Another example of a similar production method, whose main purpose is not the production of a nonwoven fabric for filters, is a method comprising mixing different fibers, at least one type of which is made of an elastomer, to improve the elasticity and feel of a resulting nonwoven fabric (see Patent Literature 11, 12 and 13).

PATENT LITERATURE

Patent Literature 1: JP 2002-201560 A
Patent Literature 2: JP 63-280408 A
Patent Literature 3: JP 9-501604 A
Patent Literature 4: JP 2002-249978 A
Patent Literature 5: JP 2-104765 A
Patent Literature 6: JP 2010-511488 A
Patent Literature 7: JP 2009-545682
Patent Literature 8: U.S. Pat. No. 5,783,011
Patent Literature 9: JP 11-131353 A
Patent Literature 10: JP 07-082649 A
Patent Literature 11: JP 2006-112025 A
Patent Literature 12: JP 2005-171456 A
Patent Literature 13: JP 6-93551 A

SUMMARY OF THE INVENTION

In the proposal described in Patent Literature 7, two types of fibers are spun from the same material. Under the spinning condition described in the literature, very coarse fibers having a fiber diameter of more than 10 µm are cooled at a slower rate than simultaneously spun very fine fibers. The insufficiently cooled fibers are bonded to each other and consequently the surface area of the fibers is reduced. In addition, the insufficiently cooled fibers fail to maintain their shapes when landing on a collector, and consequently the size of the pores between the fibers of a resulting nonwoven fabric is reduced. Therefore, in the nonwoven fabric, a low pressure drop due to the very coarse fibers mixed therein and a high collection efficiency due to the very fine fibers cannot be sufficiently exhibited.

In order to accelerate cooling of fibers in melt-blowing process, a collection distance (die to collector distance) is increased. This method is employed in Examples in Patent Literature 7. However, in melt-blowing process, a longer collection distance increases the degree of fiber entanglement and consequently reduces the effective fiber surface area. In addition, the mass distribution throughout the fabric is likely to be uneven. Such a meltblown nonwoven fabric exhibits an insufficient collection efficiency, especially when designed to have a small mass per unit area to be suitable for air filters.

In the proposals relating to a mixed-fiber meltblown nonwoven fabric comprising a plurality of materials as described in Patent Literature 10, 11, 12 and 13, an appropriate combination of fiber diameters and materials that is capable of reducing the fusion between fibers is not disclosed for a mixed-fiber nonwoven fabric with different fiber diameters comprising very coarse fibers having a fiber diameter of more than 10 µm.

Furthermore, when different materials containing a polymer having low charging properties and low charge retention properties are spun into fibers to form a meltblown nonwoven fabric to be used as an electret filter, the overall charging performance of the resulting nonwoven fabric will be reduced and thus cannot achieve a high collection efficiency.

In view of the above problems, the present invention aims to provide a mixed-fiber nonwoven fabric exhibiting a high collection efficiency and a low pressure drop and being especially suitable as a filter medium for air filters.

As a result of intensive studies, the inventors of the present invention have found that a mixed-fiber nonwoven fabric capable of solving the above problems can be obtained by selecting appropriate materials, fiber diameters and the ratio of the numbers of different types of fibers.

That is, the present invention relates to a mixed-fiber nonwoven fabric, in particular, a mixed-fiber nonwoven fabric comprising at least two types of fibers having different melting points, which fibers are low melting point fibers made of a polyolefin resin component A, and high melting point fibers, at least a portion of each of which is made of a high melting point resin component B having a higher melting point than that of the polyolefin resin component A; the number average fiber diameter of the high melting point fibers being larger than that of the low melting point fibers, at least one high melting point fiber having a fiber diameter of 20 μm to 100 μm being present per 1.00 mm of the length of the cross section of the nonwoven fabric, and the number average fiber diameter of all fibers constituting the nonwoven fabric falling within the range of 0.3 μm to 10 μm.

In a preferred embodiment of the mixed-fiber nonwoven fabric of the present invention, the nonwoven fabric is a meltblown nonwoven fabric.

In a preferred embodiment of the mixed-fiber nonwoven fabric of the present invention, the number average fiber diameter of the low melting point fibers is 0.3 μm to 7.0 μm.

In a preferred embodiment of the mixed-fiber nonwoven fabric of the present invention, the number average fiber diameter of the high melting point fibers is 15 μm to 100 μm.

In a preferred embodiment of the mixed-fiber nonwoven fabric of the present invention, the number of the low melting point fibers is 50 to 5,000 times the number of the high melting point fibers.

In a preferred embodiment of the mixed-fiber nonwoven fabric of the present invention, the nonwoven fabric is a charged nonwoven fabric.

In the present invention, a laminated sheet comprising at least one layer of the mixed-fiber nonwoven fabric can be produced, and a filter comprising the mixed-fiber nonwoven fabric or the laminated sheet can be produced.

The present invention includes a process for producing a mixed-fiber nonwoven fabric, the process comprising extruding a polyolefin resin component A and a high melting point resin component B having different melting points from separate holes provided on a single die to form fibers, and mixing the resulting fibers, and the process being performed with the conditions where the high melting point resin component B has a higher melting point than the melting point of the polyolefin resin component A, the high melting point resin component B has a higher melt viscosity than the melt viscosity of the polyolefin resin component A at a spinning temperature employed in the production process, and the fibers made from the polyolefin resin component A are spun at an apparent spinning speed which is 20 to 500 times the apparent spinning speed of the fibers made from the high melting point resin component B.

The present invention can provide a mixed-fiber nonwoven fabric exhibiting a high collection efficiency and a low pressure drop and a filter comprising the mixed-fiber nonwoven fabric and having said performance. Since the nonwoven fabric provided by the present invention exhibits a high collection efficiency, the nonwoven fabric used as a filter exhibits high performance of removing microparticles. In addition, since the pressure drop is reduced to a low level, a filter device to which the nonwoven fabric applied can be run at a lower energy level.

BRIEF DESCRIPTION OF DRAWINGS

FIG. 1 is a schematic view showing a device for measuring collection efficiency and pressure drop.

DETAILED DESCRIPTION OF EMBODIMENTS OF THE INVENTION

The embodiments of the mixed-fiber nonwoven fabric of the present invention will be described below.

The mixed-fiber nonwoven fabric of an embodiment of the present invention comprises at least two types of fibers having different melting points, which fibers are low melting point fibers made of a polyolefin resin component A, and high melting point fibers made of a high melting point resin component B having a higher melting point than that of the polyolefin resin component A.

The low melting point fibers constituting the mixed-fiber nonwoven fabric of the present invention are made of the polyolefin resin component A as described above.

A polyolefin resin has high volume resistivity and low hygroscopicity, and thus fibers of a polyolefin resin have high charging properties and high charge retention properties. Due to these effects, the mixed-fiber nonwoven fabric of an embodiment of the present invention using a polyolefin resin as a material of the low melting point fibers can exhibit a high collection efficiency.

Examples of the polyolefin resin used as the component A include homopolymers such as polyethylene, polypropylene, polybutene, and polymethylpentene. The polyolefin resin may be a copolymer obtained by copolymerization of such a homopolymer with a different type of material or a polymer blend containing two or more different polymers. Among them, polypropylene and polymethylpentene are preferably used due to their charge retention properties. Polypropylene is more preferably used because it is inexpensively available.

The polyolefin resin used as the component A preferably has a large melt flow rate (MFR) so as to be easily spun into very fine fibers. The MFR value at 230° C. and at a load of 21.18 N is, for example, preferably 100 g/10 min or more, more preferably 500 g/10 min or more. When a material having a MFR larger than the lower limit value is used as the component A, fibers can be easily attenuated and thereby fibers having a desired fiber diameter range can be easily obtained. The upper limit of the MFR is preferably 2,000 g/10 min or less. If the MFR of a material used as the component A is larger than the upper limit, the material exhibits excessively low melt viscosity during spinning and thus may cause problems in spinnability, for example, frequent occurrence of shot defects.

The high melting point fibers constituting the mixed-fiber nonwoven fabric of the present invention are made of a high melting point resin component B.

As the high melting point resin component B, a resin having a higher melting point than that of the polyolefin resin component A constituting the low melting point fibers is used. The term "melting point" herein typically refers to the temperature of an endothermic peak due to melting in differential scanning calorimetry (DSC). When a resin having a higher melting point than that of the polyolefin resin component A is used as the high melting point resin component B, the high melting point fibers having a large fiber diameter are quickly solidified. This can inhibit the fusion of the high melting point fibers and the deformation of the fibers when the fibers land on a conveyor. As a result, the resulting nonwoven fabric will have a large fiber surface area and can exhibit a reduced pressure drop when used as a filter.

The difference in melting point between the polyolefin resin component A and the high melting point resin component B is preferably 10° C. or higher, more preferably 20° C. or higher, even more preferably 30° C. or higher. If the difference in melting point between the component A and the component B is excessively small, the solidification of very coarse fibers may not be proceed, and consequently it may be difficult to provide the effect of inhibiting fusion between fibers and the deformation of fibers, resulting in failure of achieving a desired low pressure drop. The upper limit of the difference in melting point between the component A and the component B is preferably 100° C. or lower, more preferably 80° C. or lower. If the difference in melting point is larger than the value, the low melting point fibers are insufficiently cooled during spinning, and a resulting nonwoven fabric may have a reduced bulkiness.

The melting point of the polyolefin resin component A is preferably 100° C. or higher, more preferably 120° C. or higher, even more preferably 140° C. or higher. If the polyolefin resin component A has a melting point lower than the value, a resulting nonwoven fabric has poor durability and poor collection performance when used at a high temperature. The melting point of the high melting point resin component B is preferably 350° C. or lower, more preferably 300° C. or lower. If the high melting point resin component B has a melting point higher than the value, spinning process requires a highly heat-resistant device.

The polymer type used as the high melting point resin component B may be any polymer as long as it has a melting point satisfying the above requirements, and examples thereof include polyolefins such as polyethylene and polypropylene; polyesters such as polyethylene terephthalate, polytrimethylene terephthalate, polybutylene terephthalate, and polylactic acid; polycarbonate; polystyrene; polyphenylene sulfide; fluorine resins; elastomers such as polystyrene elastomers, polyolefin elastomers, polyester elastomers, polyamide elastomers, and polyurethane elastomers; and copolymers and mixtures thereof. Among them, polymers except the elastomers are preferred because rigid fibers having small deformation are easily obtained. Specifically, the polyolefins and the polyesters are preferred, and the polyesters are more preferred because their melting points are easily adjusted to a desired range.

In the present invention, the polymer used as the high melting point resin component B does not necessarily have a high charge retention properties. In cases where the nonwoven fabric is subjected to charge treatment, the polymer used as the high melting point resin component B is preferably a hydrophobic polymer. Examples of the hydrophobic polymer include polypropylenes, polyesters, and polystyrenes.

For the production of the mixed-fiber nonwoven fabric of the present invention, especially when the low melting point fibers and the high melting point fibers are spun from a single die, a resin having a higher melt viscosity than that of the polyolefin resin component A at a die temperature is preferably used as the high melting point resin component B. When such a resin having a higher melt viscosity is used as the high melting point resin component B, a nonwoven fabric in which very-coarse high melting point fibers having a number average fiber diameter of 15 μm to 100 μm are well mixed in very fine fibers having a number average fiber diameter of 0.3 μm to 10 μm is easily obtained.

Either or both of the polyolefin resin component A and the high melting point resin component B constituting the mixed-fiber nonwoven fabric of the present invention may comprise an additive for enhancing or improving characteristics such as charging properties, weatherability, thermal stability, mechanical characteristics, coloring, and surface characteristics. Especially when the mixed-fiber nonwoven fabric is subjected to charge treatment, either or both of the components preferably comprises an electret additive for enhancing charging properties. In particular, at least one compound selected from the group consisting of a hindered amine compound and a triazine compound is preferably contained as the electret additive.

Examples of the hindered amine compound include poly[(6-(1,1,3,3-tetramethylbutyl)imino-1,3,5-triazine-2,4-diyl)((2,2,6,6-tetramethyl-4-piperidyl)imino)hexamethylene ((2,2,6,6-tetramethyl-4-piperidyl)imino)] (manufactured by BASF Japan Ltd., "CHIMASSORB" (registered trademark) 944 LD), a polycondensate of dimethyl succinate with 1-(2-hydroxyethyl)-4-hydroxy-2,2,6,6-tetramethylpiperidine (manufactured by BASF Japan Ltd., "TINUVIN" (registered trademark) 622 LD), and bis(1,2,2,6,6-pentamethyl-4-piperidyl)-2-(3,5-di-t-butyl-4-hydroxybenzyl)-2-n-butylmalonate (manufactured by BASF Japan Ltd., "TINUVIN" (registered trademark) 144).

Examples of the triazine additive include the above-described poly[(6-(1,1,3,3-tetramethylbutyl)imino-1,3,5-triazine-2,4-diyl)((2,2,6,6-tetramethyl-4-piperidyl)imino) hexamethylene((2,2,6,6-tetramethyl-4-piperidyl)imino)] (manufactured by BASF Japan Ltd., "CHIMASSORB" (registered trademark) 944 LD) and 2-(4,6-diphenyl-1,3,5-triazin-2-yl)-5-((hexyl)oxy)-phenol (manufactured by BASF Japan Ltd., "TINUVIN" (registered trademark) 1577 FF). Among them, the hindered amine compounds are particularly preferred.

The hindered amine compound and/or the triazine compound is preferably contained in an amount of from 0.1% by mass to 5.0% by mass, more preferably from 0.5% by mass to 3.0% by mass, even more preferably from 0.8% by mass to 2.0% by mass relative to the total mass of the nonwoven fabric. In cases where, for example, the hindered amine compound and/or the triazine compound is attached to the surface of the nonwoven fabric or the surface of the fibers, the amount of the compound(s) is preferably 0.1% by mass to 5.0% by mass relative to the total mass of the nonwoven fabric.

The nonwoven fabric may comprise, in addition to the above compounds, additives commonly used in electret nonwoven fabrics, such as a heat stabilizer, a weathering agent, and a polymerization inhibitor.

The mass ratio (%) of the polyolefin resin component A to the high melting point resin component B in the mixed-fiber nonwoven fabric of the present invention is preferably 2:98 to 90:10. The mass ratio (%) is more preferably 10:90 to 80:20, even more preferably 30:70 to 70:30.

If the mass ratio (%) of the polyolefin resin component A constituting the low melting point fibers in the present invention is less than 2, the fiber surface area of the nonwoven fabric decreases, and thus a desired high collection efficiency is difficult to achieve.

If mass ratio (%) of the high melting point resin component B constituting at least a portion of each of the high melting point fibers of the present invention is less than 10, the component B cannot provide a sufficient effect of reducing the fusion of fibers and the deformation of fibers, and thus a desired low pressure drop is difficult to achieve. The mixed-fiber nonwoven fabric of the present invention may further comprise another component, in addition to the polyolefin resin component A and the high melting point resin B, as long as the effects of the invention are not impaired.

The process for producing the mixed-fiber nonwoven fabric of the present invention is not limited to a particular production process, and examples thereof include melt-blowing process, spun-bonding process, electrospinning process, and a process comprising entangling or mixing separately produced staples and/or filaments, and optionally bonding them. The low melting point fibers are not necessarily produced by the same process as the production process of the high melting point fibers. Two or more processes may be combined and examples of such a combined process include a process in which the low melting point fibers are spun by electrospinning process and the high melting point fibers are spun by melt-blowing process, a process in which the low melting point fibers are spun by melt-blowing process and the high melting point fibers are spun by spun-bonding process, and a process in which the low melting point fibers are spun by melt-blowing process and separately produced staples as the high melting point fibers are blown into the low melting point fibers so that the staples and the low melting point fibers are mixed together.

Among the above processes, melt-blowing process is preferred because the process requires no complicated operations and can simultaneously spin and produce a fine fiber group having a number average fiber diameter of 0.3 μm to 7.0 μm and a coarse fiber group having a number average fiber diameter of 15 μm to 100 μm. The spinning conditions in melt-blowing process include a polymer extrusion rate, a nozzle temperature, a compressed air pressure, a compressed air temperature, and the like. Optimization of these spinning conditions allows the production of a mixed-fiber nonwoven fabric having desired fiber diameters and a desired ratio of the numbers of the fibers. Specifically, a mixed-fiber nonwoven fabric having desired fiber diameters and a desired ratio of the numbers of the fibers can be obtained by appropriately combining the following conditions: using a material having a smaller melt viscosity as a material of the low melting point fibers, and using a material having a larger melt viscosity as a material of the high melting point fibers; reducing the polymer extrusion rate per hole for the low melting point fibers and increasing the polymer extrusion rate per hole for the high melting point fibers; and setting the number of the extrusion holes for the low melting point fibers to be greater than the number of the extrusion holes for the high melting point fibers.

When melt-blowing process is employed to produce the mixed-fiber nonwoven fabric of the present invention, the apparatus for the production may include, for example, a die described in U.S. Pat. No. 3,981,650, which is a single die having a structure in which different types of resins are extruded from holes arranged in a row. The die can produce a fibrous web, in which two types of fibers are more homogeneously mixed. Another method may be employed, as described in, for example, JP 8-13309 A, in which low melting point fibers and high melting point fibers are spun from separate dies and then mixed together. Another method may be employed in which a nonwoven fabric comprising low melting point fibers and a nonwoven fabric comprising high melting point fibers are separately produced, and then the nonwoven fabrics are stacked and subjected to entangling treatment such as needle punching. Preferably, the above-described single die having a structure in which different types of resins are extruded from holes arranged in a row is used because a nonwoven fabric comprising more homogeneously mixed two types of fibers can be obtained through a one-step process.

When melt-blowing process is employed to produce the mixed-fiber nonwoven fabric of the present invention, the ratio of the numbers of the die holes from which the low melting point fibers are extruded to the numbers of the die holes from which the high melting point fibers are extruded is preferably 1:15 to 15:1, more preferably 1:1 to 11:1, even more preferably 2:1 to 7:1. If the number of the holes for the low melting point fibers is small, it becomes difficult to achieve the invention's preferred ratio of the numbers of the fibers. If the number of the holes for the high melting point fibers is excessively smaller than the number of the holes for the low melting point fibers, it becomes difficult to uniformly disperse the low melting point fibers in the plane of a resulting mixed-fiber nonwoven fabric. When the holes for the low melting point fibers and the holes for the high melting point fibers are arranged in a row, the two types of holes may be alternately arranged in a row or arranged in another desired manner. For example, the two types of holes (a) and (b) may be arranged in the following manner: abba, aabbbaa, or aaaabbbaaaa. The two types of holes are preferably alternately arranged in order to produce a uniform nonwoven fabric. As necessary, in addition to the holes for the low melting point fibers and for the high melting point fibers, extrusion holes for third fibers may be provided.

When the mixed-fiber nonwoven fabric of the present invention is produced by spinning using the above-described single die having a structure in which different types of resins are extruded from holes arranged in a row, the apparent spinning speed of the fibers made of the polyolefin resin component A is preferably 20 to 500 times the apparent spinning speed of the fibers made of the high melting point resin component B. The apparent spinning speed is more preferably 40 to 200 times, even more preferably 50 to 100 times. Simultaneous extrusion of the different fibers from a single die at greatly different apparent spinning speeds allows one-step production of a mixed-fiber nonwoven fabric having desired fiber diameters and a desired ratio of the numbers of the fibers. If the ratio of the apparent spinning speeds is less than the above range, the ratio of the numbers of the extrusion holes for the two types of polymers is required to be increased in order to achieve desired fiber diameters and a desired ratio of the numbers of the fibers, and the two types of fibers are difficult to be uniformly dispersed in the mixed-fiber nonwoven fabric.

The apparent spinning speed is calculated in accordance with the following formula.

$$[\text{Apparent spinning speed(m/min)}] = \frac{4[\text{Polymer extrusion rate per hole(kg/(min·hole))}]}{\pi[\text{Number average fiber diameter(m)}]^2 [\text{Polymer solid density(kg/m}^3)]}$$

The apparent spinning speed herein is determined in the same manner as in the calculation of a spinning speed in a typical melt spinning process, but does not always agree with an actual spinning speed when the fibers are spun by melt-blowing process. Increase in the difference in the apparent spinning speed between the fibers extruded from a single die can be achieved by increasing the difference in the melt viscosity between resin raw materials to be used. In the mixed-fiber nonwoven fabric of the present invention, a material having a lower viscosity is preferably used as the polyolefin resin component A, and a material having a higher viscosity is preferably used as the high melting point resin component B.

When melt-blowing process is employed to produce the mixed-fiber nonwoven fabric of the present invention, the collection distance (die to collector distance, DCD) is preferably in a range of 5 cm to 30 cm, more preferably 10 cm to 25 cm. If the collection distance is excessively large, the degree of entanglement of the spun fibers increases, which reduces the fiber surface area that effectively functions as a filter. In addition, the mass distribution throughout the fabric is likely to be uneven. Therefore, such a fabric is unsuitable as a filter medium. If the collection distance is excessively small, insufficiently solidified fibers are formed into a sheet, and thus fusion between the fibers is increased resulting in reduction in the fiber surface area and increase in the pressure drop. Examples of the collector system include a drum system, a conveyor system, a combined system of a drum and a conveyor as disclosed in JP 2011-168903 A, and a collector in the form of cylindrical filter as disclosed in U.S. Pat. No. 5,783,011.

The mixed-fiber nonwoven fabric of the present invention comprises a mixture of at least two types of fibers having different average fiber diameters and thereby achieves high filtration performance. Although the mechanism of this effect is unclear, the effect is considered to be exhibited as follows. Of the two types of fibers, the low melting point fibers having a smaller average fiber diameter exhibit the function of improving the collection efficiency of the mixed-fiber nonwoven fabric of the present invention. The high melting point fibers having a larger average fiber diameter mainly exhibit the function of reducing the pressure drop of the mixed-fiber nonwoven fabric of the present invention. The low melting point fibers having a smaller average fiber diameter have a large specific surface area and thus can efficiently collect particles on the fiber surfaces. In the network of the low melting point fibers, the high melting point fibers having a larger average fiber diameter are integrated, thereby large pores are formed between the low melting point fibers. The presence of the pores between the fibers improves breathability of the nonwoven fabric and reduces pressure drop. In order to more efficiently achieve the effect, the two types of fibers are preferably homogeneously mixed in the thickness direction of the nonwoven fabric.

The term "average fiber diameter of the fibers" herein refers to a number average fiber diameter, which can be determined by taking micrographs of the surface or the cross section of a nonwoven fabric, measuring the fiber diameters of the fibers present in the micrographs, and calculating the mean value. The term "fiber diameter" herein refers to the diameter of a fiber when the cross section of the fiber is perfect circle. When the cross section of a fiber is not perfect circle, the term "fiber diameter" refers to the maximum diameter of the cross section that is perpendicular to the axial direction of the fiber.

The number average fiber diameter of the low melting point fibers is preferably 0.3 µm to 7.0 µm, more preferably 0.5 µm to 3.0 µm, even more preferably 1.0 µm to 2.0 µm. If the number average fiber diameter is excessively large, the specific surface area of the fibers is small, which may result in insufficient particle collection performance. The low melting point fibers are preferably subjected to charge treatment in order to exhibit improved collection efficiency.

In the mixed-fiber nonwoven fabric of an embodiment of the present invention, at least one high melting point fiber having a fiber diameter of 20 µm to 100 µm is present per 1.00 mm of the length of the cross section of the nonwoven fabric. Preferably three or more, more preferably ten or more, high melting point fibers having a fiber diameter of 20 µm to 100 µm are present per 1.00 mm of the length of the cross section of the nonwoven fabric. The number of the fibers present per 1.00 mm of the length of the cross section of a nonwoven fabric can be determined as follows. Two cross sections perpendicular to the surface of the nonwoven fabric are obtained so that the two cross sections are perpendicular to each other. The two cross sections are observed under various microscopes to count the number of fibers present per length of each cross section. The fiber numbers obtained from the two cross sections were averaged. If the high melting point fibers in the cross section contain no high melting point fiber having a diameter of 20 µm or more, their effect of supporting pores between fibers is small. If the number of the high melting point fibers having a fiber diameter of 20 µm to 100 µm present per 1 mm of the length of the cross section of the mixed-fiber nonwoven fabric is less than one, the effect of supporting pores between fibers is also small.

The number average fiber diameter of the high melting point fibers is preferably 15 µm to 100 µm, more preferably 20 µm to 50 µm, even more preferably 20 µm to 40 µm. If the number average fiber diameter of the high melting point fibers is less than the above values, their effect of supporting pores between fibers may be small. If the number average fiber diameter of the high melting point fibers is more than the above values, a larger amount of resin materials are required in order to produce the high melting point fibers and thus may be economically disadvantageous.

The number average fiber diameter of all fibers constituting the mixed-fiber nonwoven fabric of an embodiment of the present invention falls within the range of 0.3 µm to 10 µm, more preferably 0.5 µm to 7.0 µm, even more preferably 0.5 µm to 2.0 µm. In the structure of the mixed-fiber nonwoven fabric of an embodiment of the present invention, the number of the low melting point fibers, whose number average fiber diameter is smaller than that of the high melting point fibers, is overwhelmingly greater than the number of the high melting point fibers having a fiber diameter of 20 µm or more. Therefore, the average fiber diameter of the whole nonwoven fabric is small. The fiber diameters and numbers of the low melting point fibers and the high melting point fibers are designed so that the number average fiber diameter of all fibers constituting the nonwoven fabric falls within the above range, and thereby a mixed-fiber nonwoven fabric satisfying both a low pressure drop and a high collection efficiency can be obtained. If the number average fiber diameter of all fibers constituting the mixed-fiber nonwoven fabric is larger than the above range, the specific surface area of the fibers is small, resulting in an insufficient collection efficiency. If the number average fiber diameter is smaller than the above range, the pressure drop increases.

The high melting point fibers are made of the high melting point resin component B having a higher melting point than that of the polyolefin resin component A. Since the high melting point fibers comprise the high melting point resin component B, the high melting point fibers can inhibit fusion between fibers and the deformation of fibers and thereby can efficiently exert the effect of supporting pores. The high melting point fibers may comprise an additional component as long as a portion of each of the fibers comprises the high melting point resin component B and the additional component does not prevent the effects of the present invention. For example, the high melting point fibers may be composite fibers using the high melting point resin component B as a core and using an additional resin component C as a sheath, or composite fibers using the high melting point resin component B as a sheath and using an additional resin component C as a core. In the former case, the high melting point fibers exert at least the effect of inhibiting the deformation of fibers. In the latter case, the high melting point fibers exert at least the effect of inhibiting fusion between fibers.

The composite fibers may be composite fibers of the polyolefin resin component A and the high melting point resin component B, or tri-component fibers of the polyolefin resin component A, the high melting point resin component B, and an additional component C. The type of the composite fibers may be, in addition to the core-sheath type, any known type including a side-by-side type, an eccentric core-sheath type, and an islands-in-a-sea type. The cross section of the high melting point fibers may be, in addition to a round shape, any shape such as a triangular shape, a Y shape, a flat shape, a multi-leaf shape, and a flat shape.

In the mixed-fiber nonwoven fabric of the present invention, the number of the low melting point fibers is preferably 50 to 5,000 times the number of the high melting point fibers, more preferably 60 to 1,000 times, even more preferably 90 to 500 times. The ratio of the numbers of the fibers herein can be determined by obtaining any two cross sections that are perpendicular to the surface of the mixed-fiber nonwoven fabric so that the two cross sections are perpendicular to each other, counting the numbers of the two types of fibers present in the cross sections, and calculating the mean value of the ratio of the numbers.

The mixed-fiber nonwoven fabric of the present invention has a structure in which the number of the low melting point fibers having a smaller fiber diameter is overwhelmingly greater than the number of the high melting point fibers having a larger fiber diameter. Therefore, although the mixed-fiber nonwoven fabric of an embodiment of the present invention comprises the very coarse fibers having a fiber diameter as large as 20 μm or more, the specific surface area of the fabric is large. Consequently, the mixed-fiber nonwoven fabric of the present invention can exhibit a high collection efficiency.

In addition, due to the distinctive structure in which the number of the low melting point fibers is overwhelmingly greater than the number of the high melting point fibers and in which the number average fiber diameter of the high melting point fibers is overwhelmingly greater than the number average fiber diameter of the low melting point fibers, the low melting point fibers occupy most of the surface area of the mixed-fiber nonwoven fabric. Therefore, in cases where the mixed-fiber nonwoven fabric is subjected to charge treatment, even if the high melting point fibers comprise a component having low charge retention properties, the overall charging performance and the overall charge retention properties of the nonwoven fabric are high.

If the proportion of the number of the low melting point fibers relative to the number of the high melting point fibers is lower than the above range, a desired high collection efficiency cannot be obtained, and especially when the nonwoven fabric is subjected to charge treatment, a significant reduction in the collection performance will be observed. The reduction in the collection performance is particularly significant when polypropylene is employed as the polyolefin resin component A. Polypropylene is an inexpensive material and can exhibit high charging properties and high charge retention properties. Due to these characteristics, polypropylene is widely used as a material for charged filters. However, most of the resins having a higher melting point than polypropylene have poor charge retention properties. In the present invention, the ratio of the numbers of the fibers is preferably adjusted to the specified range, and thereby the nonwoven fabric can achieve high filtration performance, while comprising such a high melting point resin.

For the determination of the fiber diameters, number average fiber diameters, and number ratio of the low melting point fibers and the high melting point fibers in the mixed-fiber nonwoven fabric of the present invention, the two types of fibers can be distinguished from each other by various methods. For example, the difference in melting point or in resistance to a chemical solution between the two types of fibers is utilized to remove one type of fibers and the diameter of the remained other type of fibers is determined under various microscopes such as an optical microscope and a scanning electron microscope. Alternatively, the diameters and the ratio may be determined while the components of the fibers are analyzed by a technique capable of analyzing matter distribution in a micro area, such as microscopic Raman spectroscopy, microscopic infrared spectrometry, electron beam microanalysis, and time-of-flight secondary ion mass spectroscopy. For example, whether the number average fiber diameter of the high melting point fibers is larger than that of the low melting point fibers in the mixed-fiber nonwoven fabric of the present invention can be determined by heating the mixed-fiber nonwoven fabric at a temperature between the melting points of the two components so that the low melting point fibers are melted, then determining the number average fiber diameter of fibers in the whole nonwoven fabric, and comparing the number average fiber diameter after the heat treatment with the average fiber diameter before the heat treatment.

The mass per unit area of the mixed-fiber nonwoven fabric of the present invention is preferably 5 $g/m^2$ or more, more preferably 10 $g/m^2$ or more, and when used as a filter medium for air filters, the mass per unit area is even more preferably 15 $g/m^2$ or more. If the mass per unit area of the mixed-fiber nonwoven fabric is excessively small, the nonwoven fabric will have lower strength, which may cause problems during the conveyance of the nonwoven fabric in the production process. The mass per unit area of the mixed-fiber nonwoven fabric is preferably 1,000 $g/m^2$ or less, more preferably 200 $g/m^2$ or less, and when used as a filter medium for air filters, the mass per unit area is even more preferably 40 $g/m^2$ or less. The mixed-fiber nonwoven fabric having an excessively large mass per unit area is disadvantageous in terms of the production cost.

In the mixed-fiber nonwoven fabric of the present invention, the number of the high melting point fibers with a fiber diameter of 20 μm to 100 μm present per [the length of the cross section]×[mass per unit area] is preferably 0.10 (fibers·$m^2$/(g·mm)) or more, more preferably 0.20 (fibers·$m^2$/(g·mm)) or more, even more preferably 0.30 (fibers·$m^2$/(g·mm)) or more. The number of the fibers present per [the length of the cross section]×[mass per unit area] is defined by the following formula. If the number of the high melting point fibers with a fiber diameter of 20 μm to 100 μm present per [the length of the cross section]×[mass per unit area] is excessively small, the effect brought by the high melting point fibers cannot be provided over the whole of the nonwoven fabric.

[Number of fibers per[length of cross section] × [mass per unit]

$$(\text{fibers} \cdot m^2/(g \cdot mm))] = \frac{[\text{Number of fibers present in cross section of nonwoven fabric(fibers)}]}{\left( \frac{[\text{Mass per unit area}(g/m^2)]}{[\text{length of observed cross section(mm)}]} \right)}$$

The mixed-fiber nonwoven fabric of the present invention is preferably subjected to charge treatment (electret treatment). Especially when the mixed-fiber nonwoven fabric is made into an electret nonwoven fabric sheet, such an electret nonwoven fabric sheet can exhibit electrostatic adsorption effect, thereby achieving a much lower pressure drop and a much higher collection efficiency. The electret treatment is preferably performed by providing water to the nonwoven fabric of the present invention and then drying the nonwoven fabric to give a high-performance nonwoven fabric, but is not limited to this method. Water is provided to the mixed-fiber nonwoven fabric by, for example, a method in which water jet streams or water droplet streams are sprayed on the nonwoven fabric at a sufficient pressure to allow the water to infiltrate into the nonwoven fabric; a method in which, after or while water is provided to the mixed-fiber nonwoven fabric, the water is sucked from the one side of the nonwoven fabric so as to infiltrate into the nonwoven fabric; a method in which the mixed-fiber nonwoven fabric is immersed in a mixed solution of water and a water-soluble organic solvent such as isopropyl alcohol, ethyl alcohol, and acetone to allow the water to infiltrate into the nonwoven fabric; or the like. However, the electret treatment is not limited thereto.

The mixed-fiber nonwoven fabric of the present invention exhibits a high collection efficiency suitable for a filter medium for filters. The mixed-fiber nonwoven fabric after charge treatment preferably exhibits a collection efficiency of 90.00% or more for polystyrene particles having a particle diameter of 0.3 μm to 0.5 μm at an air velocity of 4.5 m/min, more preferably 99.00% or more, even more preferably 99.90% or more. The mixed-fiber nonwoven fabric exhibiting a collection efficiency of 99.90% or more is especially suitable as a filter medium for high-performance air filters.

Typically, the collection efficiency correlates with the mass per unit area. The collection efficiency for a mass per unit area of 10 g/m² of the mixed-fiber nonwoven fabric of the present invention, calculated in accordance with the following formula, is preferably 50.0% or more, more preferably 75.0% or more, even more preferably 90.0% or more. When the collection efficiency for a mass per unit area of 10 g/m² is higher, the mass per unit area required to achieve a desired collection efficiency is smaller. Therefore, a higher collection efficiency for a mass per unit area of 10 g/m² is advantageous in terms of the cost.

$$[\text{Collection efficiency}(\%) \text{ for mass per unit area of } 10 \text{ g/m}^2] = 100 \times \left\{1 - 10^{\frac{10}{\text{Mass per unit}(g/m^2)} \log_{10}\left(1 - \frac{\text{Collection efficiency }(\%)}{100}\right)}\right\}$$

The mixed-fiber nonwoven fabric of an embodiment of the present invention has a characteristic to achieve a high collection efficiency while exhibiting a low pressure drop. The QF of the nonwoven fabric of the present invention, defined by the following formula, is preferably 0.10 Pa$^{-1}$ or more, more preferably 0.13 Pa$^{-1}$ or more, even more preferably 0.16 Pa$^{-1}$ or more. When the value of QF is higher, a certain collection efficiency can be obtained with a lower pressure drop.

$$[QF(\text{Pa}^{-1})] = -\frac{\ln\left(1 - \frac{[\text{Collection efficiency}(\%)]}{100}\right)}{[\text{Pressure drop (Pa)}]}$$

The mixed-fiber nonwoven fabric of the present invention may be stacked on another sheet to yield a laminated nonwoven fabric. For example, the nonwoven fabric sheet of the present invention is preferably stacked on another sheet having higher rigidity than the nonwoven fabric to yield a product with improved strength. In another example, the nonwoven fabric of the present invention is preferably combined with another sheet having a deodorizing function, an antibacterial function, or the like. The lamination method is not particularly limited, and the lamination can be performed by, for example, a method in which two types of nonwoven fabrics are bonded with an adhesive; a method in which a nonwoven fabric is formed by melt-blowing process on another nonwoven fabric sheet produced by a process other than melt-blowing process so as to be stacked; or the like. The bonding of two types of nonwoven fabrics may be performed by other methods, for example, a method in which a moisture curable urethane resin is sprayed on a nonwoven fabric; a method in which a thermoplastic resin or a thermally fusible fiber is dispersed on a nonwoven fabric, another nonwoven fabric is stacked thereon, and the nonwoven fabrics are passed through a heater so as to bond together; or the like. The bonding method is not particularly limited as long as the two types of nonwoven fabrics are bonded together.

However, since the mixed-fiber nonwoven fabric of the present invention is intended to be used mainly as a filter, such a bonding method that could increase pressure drop is not preferred. On this account, a spraying method using a moisture curable urethane resin is preferred because the method can bond two nonwoven fabrics without pressing the fabrics and thus may not cause an increase in the pressure drop due to bonding.

The present invention can provide a mixed-fiber nonwoven fabric exhibiting a low pressure drop and a high collection efficiency. The mixed-fiber nonwoven fabric is suitable as a filter medium especially for air filters.

The mixed-fiber nonwoven fabric of the present invention, which can be used as a filter medium for filters, is suitable for air filters in general and is especially suitable for high-performance applications such as filters for air conditioners, filters for air cleaners, and automotive cabin filters, but the application of the nonwoven fabric is not limited thereto.

EXAMPLES

The mixed-fiber nonwoven fabric of the present invention will be more specifically described with reference to Examples. The characteristic values in Examples were determined by the following measurement methods.

(1) Mass Per Unit Area of Nonwoven Fabric

From a nonwoven fabric, three pieces each 15 cm in length and 15 cm in width were cut out and the masses of the pieces were measured. The obtained values were converted into the values per square meter and the mean value was calculated to yield a mass per unit area (g/m²) of the nonwoven fabric.

(2) Number Average Fiber Diameter

From an arbitrary area of a nonwoven fabric, 12 samples each 3 mm in length and 3 mm in width were cut out. The fiber surfaces of the samples were observed with a scanning electron microscope at an appropriate magnification and one photograph was taken for each sample (12 photographs in total). The magnification was 200 to 3,000 times. In the photograph, all the fibers whose diameters were clearly observed were selected, and the diameters were measured at an accuracy of 0.1 μm. The obtained values was summed and the sum was divided by the number of the fibers subjected to the measurement to give a number average fiber diameter. The number average fiber diameter not less than 1.0 μm is expressed to two significant digits, and the number average fiber diameter less than 1.0 μm is expressed to one significant digit.

(3) Number of Fibers

From an arbitrary area of a nonwoven fabric, 12 samples each 20 mm in length and 5 mm in width were cut out so that the long sides of six nonwoven fabric samples of the 12 samples were perpendicular to the long sides of the other six nonwoven fabric samples. The obtained nonwoven fabric samples were impregnated with an epoxy resin to allow solidification. The nonwoven fabric samples were cut in the direction parallel to the short side by means of a single-edged razor blade to prepare sample pieces each 1 mm in length and 5 mm in width. The cross sections of the sample pieces were photographed with a scanning electron microscope and 12 photographs of the cross sections of the nonwoven fabric were obtained in total. The magnification was 200 times to 1,000 times. In the photograph, all the fibers whose cross sections were clearly observed were selected and the number of the fibers was counted.

(4) Collection Efficiency and Pressure Drop

From five places in the longitudinal direction of a nonwoven fabric, samples each 15 cm in length and 15 cm in width were cut out. The collection efficiency and the pressure drop of each sample were determined with the collection efficiency measurement device shown in FIG. 1. The collection efficiency measurement device includes a sample holder 1 to hold a measurement sample M. The upstream of the sample holder 1 is connected to a dust storing box 2, and the downstream of the sample holder 1 is connected to a flow meter 3, a flow control valve 4, and a blower 5. The sample holder 1 is equipped with a particle counter 6 and the number of dust particles can be counted at each of the upstream and downstream sides of the measurement sample M by operating a switch cock 7. The sample holder 1 also equipped with a pressure gauge 8, which can indicate the static pressure difference between the upstream side and the downstream side of the measurement sample M. The collection efficiency was determined as follows. A 10% polystyrene 0.309 U solution (available from Nacalai Tesque, Inc.) was diluted 200-fold with distilled water and placed in the dust storing box 2. Next, the measurement sample M was placed in the sample holder 1. Airflow was adjusted with the flow control valve 4 so that the air passed through the filter (sample) at a velocity of 4.5 m/min. The dust concentration was maintained at a range of 10,000 to 40,000 particles/$2.83 \times 10^{-4}$ $m^3$ (0.01 $ft^3$). The number of the dust particles at the upstream side (D) and the number of the dust particles at the downstream side (d) were measured for the sample M using the particle counter 6 (KC-01B manufactured by RION Co., Ltd.). The measurement was repeated three times for each sample. The collection efficiency (%) for the particles having a diameter of 0.3 µm to 0.5 µm was calculated using the following formula based on JIS K 0901:1991 "Form, size and performance testing methods of filtration media for collecting airborne particulate matters". The mean value from the five samples was taken as a final collection efficiency result.

Collection efficiency (%)=[1−(d/D)]×100

(In the formula, d is the sum of the number of dust particles at the downstream side in three measurements, and D is the sum of the number of dust particles at the upstream side in three measurements.)

A nonwoven fabric capable of collecting more dust gives a smaller number of dust particles at the downstream side and therefore gives a higher collection efficiency. The pressure drop was determined by reading the static pressure difference between the upstream side and the downstream side of the sample M with the pressure gauge 8 during the measurement of the collection efficiency. The mean value from the five samples was taken as a final pressure drop result.

(5) QF

The value of QF as an index of the filtration performance is calculated from the collection efficiency and the pressure drop in accordance with the following formula. A higher value of QF indicates a lower pressure drop and a higher collection efficiency, i.e., better filtration performance.

$$[QF(Pa^{-1})] = -\frac{\ln\left(1 - \frac{[\text{Collection efficiency}(\%)]}{100}\right)}{[\text{Pressure drop (Pa)}]}$$

Example 1

A polypropylene (PP) resin containing 1% by mass of "CHIMASSORB" (registered trademark) 944 (manufactured by BASF Japan Ltd.) (melting point: 163° C., MFR=860 g/10 min) was used as the polyolefin resin component A, and a polybutylene terephthalate (PBT) resin (melting point: 225° C.) was used as the high melting point resin component B.

A meltblown nonwoven fabric was produced with an apparatus including two extruders and gear pumps, a melt-blown die for mixed-fiber spinning having two types of holes (a, b) (hole diameter of (a): 0.25 mm, hole diameter of (b): 0.6 mm, number of holes (a): 95, number of holes (b): 20, die width: 150 mm, (a)-(a) hole pitch: 1 mm, (a)-(b) hole pitch: 2 mm, hole arrangement: the holes (a, b) were arranged in a row so that five holes (a) were interposed between two holes (b)), a compressed air generator and an air heater, a collecting conveyor, and a winding system.

Resin pellets of the component A and resin pellets of the component B were fed into the two separate extruders, and the pellets were heated and melted at a temperature of 280° C. The gear pumps were adjusted so that the mass ratio (%) of the component A:the component B was 41:59. The component A and the component B were delivered by the gear pumps to the holes (a) and the holes (b), respectively, of the melt-blown die for mixed-fiber spinning and were extruded at extrusion rates per hole of 0.15 g/min/hole and 1.02 g/min/hole, respectively, at a nozzle temperature of 280° C. The extruded polymers were attenuated and blown by compressed air at 0.05 MPa and at 300° C. to the collecting conveyor disposed 20 cm apart from the die holes to form a sheet. By controlling the speed of the collecting conveyor, a mixed-fiber nonwoven fabric having a mass per unit area of 30 g/$m^2$ was obtained.

The mixed-fiber nonwoven fabric obtained in Example 1 was subjected to heat treatment with a hot-air drier at a temperature of 175° C. for 5 minutes so that the polypropylene (PP) fibers were melted. The number average fiber diameter and the number of the fibers of the nonwoven fabric were determined to give the number average fiber diameter of the high melting point fibers.

Separately, the mixed-fiber nonwoven fabric obtained in Example 1 was treated with 2-chlorophenol so that the polybutylene terephthalate (PBT) fibers were dissolved. The number average fiber diameter and the number of the fibers of the nonwoven fabric were determined to give the number average fiber diameter of the low melting point fibers.

Separately, the mixed-fiber nonwoven fabric obtained in Example 1 was immersed in a mixed aqueous solution of pure water/isopropanol in a mass ratio of 70/30 and was allowed to naturally dry to yield an electret meltblown mixed-fiber nonwoven fabric. The characteristics of the electret meltblown mixed-fiber nonwoven fabric were determined and the resulting values are shown in Table 1.

Example 2

A nonwoven fabric was produced in the same manner as in Example 1 except that a polypropylene (PP) resin containing 1% by mass of "CHIMASSORB" (registered trademark) 944 (manufactured by BASF Japan Ltd.) (melting point: 163° C., MFR=1,550 g/10 min) was used as the polyolefin resin component A, that the mass ratio (%) of the polyolefin resin component A to the high melting point resin component B was 60:40, that the extrusion rate per hole (a) was 0.28 g/min/hole, that the extrusion rate per hole (b) was 0.90 g/min/hole, that the compressed air temperature was 305° C., and that the compressed air pressure was 0.06 MPa.

The mixed-fiber nonwoven fabric obtained in Example 2 was subjected to heat treatment with a hot-air drier at a temperature of 175° C. for 5 minutes so that the polypropylene (PP) fibers were melted. The number average fiber diameter and the number of the fibers of the nonwoven fabric were determined to give the number average fiber diameter of the high melting point fibers.

Separately, the mixed-fiber nonwoven fabric obtained in Example 2 was treated with 2-chlorophenol so that the polybutylene terephthalate (PBT) fibers were dissolved. The number average fiber diameter and the number of the fibers of the nonwoven fabric were determined to give the number average fiber diameter of the low melting point fibers.

Separately, the nonwoven fabric obtained in Example 2 was subjected to electret treatment in the same manner as in Example 1. The characteristics of the electret nonwoven fabric were determined and the resulting values are shown in Table 1.

Example 3

A nonwoven fabric was produced in the same manner as in Example 1 except that a copolymer obtained by copolymerizing 11% by mole of isophthalic acid with a polyethylene terephthalate (PET) resin containing 0.3% by mass of titanium oxide (melting point: 230° C.) was used as the high melting point resin component B, that the mass ratio (%) of the polyolefin resin component A to the high melting point resin component B was 41:59, that the extrusion rate per hole (b) was 1.01 g/min/hole, and that the compressed air temperature was 305° C.

The mixed-fiber nonwoven fabric obtained in Example 3 was subjected to heat treatment with a hot-air drier at a temperature of 175° C. for 5 minutes so that the polypropylene (PP) fibers were melted. The number average fiber diameter and the number of the fibers of the nonwoven fabric were determined to give the number average fiber diameter of the high melting point fibers.

Separately, the mixed-fiber nonwoven fabric obtained in Example 3 was treated with 2-chlorophenol so that the polyethylene terephthalate (PET) fibers were dissolved. The number average fiber diameter and the number of the fibers of the nonwoven fabric were determined to give the number average fiber diameter of the low melting point fibers.

Separately, the nonwoven fabric obtained in Example 3 was subjected to electret treatment in the same manner as in Example 1. The characteristics of the electret nonwoven fabric were determined and the resulting values are shown in Table 1.

Example 4

A nonwoven fabric was produced in the same manner as in Example 1 except that a polymethylpentene resin (melting point: 235° C., TPX (registered trademark) DX820 manufactured by Mitsui Chemicals, Inc.) was used as the high melting point resin component B, that the mass ratio (%) of the polyolefin resin component A to the high melting point resin component B was 40:60, that the extrusion rate per hole (b) was 1.05 g/min/hole, and that the compressed air temperature was 305° C.

The observation of the cross section of the nonwoven fabric obtained in Example 4 with a scanning electron microscope confirmed that the nonwoven fabric had clearly different fiber diameter distribution in which a group of the fibers extruded from the holes (a) had a fiber diameter of less than 10 μm and a group of the fibers extruded from the holes (b) had a fiber diameter of 10 μm or more. On the basis of the observation, the number average fiber diameters and the numbers of the fibers were determined for the fiber group having a fiber diameter of less than 10 μm and the fiber group having a fiber diameter of 10 μm or more.

Separately, the nonwoven fabric obtained in Example 4 was subjected to electret treatment in the same manner as in Example 1. The characteristics of the electret nonwoven fabric were determined and the resulting values are shown in Table 1.

Comparative Example 1

A nonwoven fabric was produced in the same manner as in Example 1 except that a polypropylene resin containing 1% by mass of "CHIMASSORB" (registered trademark) 944 (manufactured by BASF Japan Ltd.)(melting point: 163° C., MFR=60 g/10 min) was used as the resin component B, that the mass ratio (%) of the polyolefin resin component A to the resin component B was 43:57, and that the extrusion rate per hole (b) was 0.90 g/min/hole.

The observation of the cross section of the nonwoven fabric obtained in Comparative Example 1 with a scanning electron microscope confirmed that the nonwoven fabric had clearly different fiber diameter distribution in which a group of the fibers extruded from the holes (a) had a fiber diameter of less than 10 μm and a group of the fibers extruded from the holes (b) had a fiber diameter of 10 μm or more. On the basis of the observation, the number average fiber diameters and the numbers of the fibers were determined for the fiber group having a fiber diameter of less than 10 μm and the fiber group having a fiber diameter of 10 μm or more.

Separately, the nonwoven fabric obtained in Comparative Example 1 was subjected to electret treatment in the same manner as in Example 1. The characteristics of the electret nonwoven fabric were determined and the resulting values are shown in Table 1.

Comparative Example 2

A nonwoven fabric was produced in the same manner as in Example 1 except that the diameter of the holes (b) of the melt-blown die for mixed-fiber spinning was 0.4 mm, that a polypropylene resin containing 1% by mass of "CHIMASSORB" (registered trademark) 944 (manufactured by BASF Japan Ltd.) (melting point: 163° C., MFR=860 g/10 min) was used as the component B, that the mass ratio (%) of the component A to the component B was 40:60, that the extrusion rate per hole (a) was 0.19 g/min/hole, that the extrusion rate per hole (b) was 1.39 g/min/hole, that the nozzle temperature was 255° C., that the compressed air pressure was 0.15 MPa, and that the compressed air temperature was 265° C.

The cross section of the nonwoven fabric obtained in Comparative Example 2 was observed with a scanning electron microscope. From the observation photographs, the two types of fibers extruded from the holes (a) and (b) could not be distinguished because the fibers extruded from the holes (a) had a similar fiber diameter to that of the fibers extruded from the holes (b). Therefore, the number average fiber diameter of each type of fibers could not be determined. No fibers having a fiber diameter of more than 20 μm was observed.

Separately, the nonwoven fabric obtained in Comparative Example 2 was subjected to electret treatment in the same manner as in Example 1. The characteristics of the electret nonwoven fabric were determined and the resulting values are shown in Table 1.

In Example 3, it was possible to produce a mixed-fiber nonwoven fabric comprising a mixture of fibers having a number average fiber diameter of 1.2 μm and being made of the polypropylene having a melting point of 163° C. and fibers having a number average fiber diameter 29 μm and being made of the polyethylene terephthalate copolymer having a melting point of 230° C.

In Example 4, it was possible to produce a mixed-fiber nonwoven fabric comprising a mixture of fibers having a number average fiber diameter of 1.3 μm and being made of the polypropylene having a melting point of 163° C. and fibers having a number average fiber diameter of 66 μm and being made of the polymethylpentene having a melting point of 235° C.

The mixed-fiber nonwoven fabrics obtained in Examples 1 to 4 showed a high collection efficiency and a low pressure drop.

TABLE 1

|  | Example 1 | Example 2 | Example 3 | Example 4 | Comparative Example 1 | Comparative Example 2 |
| --- | --- | --- | --- | --- | --- | --- |
| Component A |  |  |  |  |  |  |
| Type | PP | PP | PP | PP | PP | PP |
| MFR (g/10 min) | 860 | 1550 | 860 | 860 | 860 | 860 |
| Melting point (° C.) | 163 | 163 | 163 | 163 | 163 | 163 |
| Solid density (g/cm$^3$) | 0.9 | 0.9 | 0.9 | 0.9 | 0.9 | 0.9 |
| Ratio (%) | 41 | 60 | 41 | 40 | 43 | 40 |
| Component B |  |  |  |  |  |  |
| Type | PBT | PBT | PET copolymer | TPX | PP | PP |
| MFR (g/10 min) | — | — | — | — | 80 | 860 |
| Melting point (° C.) | 225 | 225 | 230 | 235 | 163 | 163 |
| Solid density (g/cm$^3$) | 1.3 | 1.3 | 1.3 | 0.8 | 0.9 | 0.9 |
| Ratio (%) | 59 | 40 | 59 | 60 | 57 | 60 |
| Mass per unit area (g/m$^2$) | 30 | 30 | 30 | 30 | 30 | 30 |
| Number of fibers of component B with fiber diameter of 20 to 100 μm present per 1.00 mm of length of cross section | 16 | 14 | 8 | 5 | 11 | none |
| Number average fiber diameter (μm) |  |  |  |  |  |  |
| Whole sheet | 1.5 | 1.9 | 1.3 | 1.4 | 1.4 | 2.2 |
| Component A | 1.5 | 1.8 | 1.2 | 1.3 | 1.3 | Indistinguishable |
| Component B | 25 | 20 | 29 | 66 | 28 |  |
| Ratio of numbers of fibers (component A/component B) | 96 | 93 | 295 | 686 | 156 | Unmeasurable |
| Ratio of spinning speeds (component A/component B) | 59 | 55 | 130 | 330 | 79 | Unmeasurable |
| Collection performance |  |  |  |  |  |  |
| Pressure drop (Pa) | 40 | 42 | 35 | 27 | 47 | 38 |
| Collection efficiency (%) | 99.93 | 99.99 | 99.95 | 99.78 | 99.93 | 99.03 |
| QF (Pa$^{-1}$) | 0.18 | 0.22 | 0.21 | 0.22 | 0.15 | 0.12 |

As apparent from Table 1, in Example 1, the adjustment of the two types of materials and of the extrusion rate, the compressed air pressure, the nozzle temperature, and the like of the melt-blown spinning apparatus for mixing fibers allowed the production of a mixed-fiber nonwoven fabric comprising a mixture of fibers having a number average fiber diameter of 1.5 μm and being made of the polypropylene having a melting point of 163° C. and fibers having a number average fiber diameter of 25 μm and being made of the polybutylene terephthalate having a melting point of 225° C.

In a similar manner, in Example 2, it was possible to produce a mixed-fiber nonwoven fabric comprising a mixture of fibers having a number average fiber diameter of 1.8 μm and being made of the polypropylene having a melting point of 163° C. and fibers having a number average fiber diameter of 20 μm and being made of the polybutylene terephthalate having a melting point of 225° C.

In contrast, in the nonwoven fabric of Comparative Example 1, the coarse fibers having a fiber diameter 20 μm to 100 μm contained no high melting point component and the nonwoven fabric therefore showed increased fusion between fibers and a large pressure drop. The nonwoven fabric of Comparative Example 2 contained neither fibers having a fiber diameter of 20 μm to 100 μm nor high melting point fibers and thus failed to exhibit a sufficient collection efficiency.

As described above, by adjusting the number average fiber diameters of the fine fibers and the coarse fibers to the specified ranges and by using the specific materials to form the two types of fibers, the nonwoven fabric comprising the two types of fibers having different number average fiber diameters could exhibit a low pressure drop and an excellent collection efficiency.

REFERENCE SIGNS LIST

1: Sample holder
2: Dust storing box
3: Flow meter
4: Flow control valve
5: Blower
6: Particle counter
7: Switch cock
8: Pressure gauge
M: Sample for measurement

The invention claimed is:

1. A mixed-fiber nonwoven fabric, which is a meltblown nonwoven fabric comprising at least two types of fibers having different melting points, which fibers are
   low melting point fibers made of a polyolefin resin component A, and
   high melting point fibers, at least a portion of each of which is made of a high melting point resin component B having a higher melting point than that of the polyolefin resin component A;
   the number average fiber diameter of the high melting point fibers being larger than that of the low melting point fibers,
   at least one high melting point fiber having a fiber diameter of 20 μm to 100 μm being present per 1.00 mm of the length of the cross section of the nonwoven fabric, and
   the number average fiber diameter of all fibers constituting the nonwoven fabric falling within the range of 0.3 μm to 10 μm.

2. The mixed-fiber nonwoven fabric according to claim 1, wherein the number average fiber diameter of the low melting point fibers is 0.3 μm to 7.0 μm.

3. The mixed-fiber nonwoven fabric according to claim 1, wherein the number average fiber diameter of the high melting point fibers is 15 μm to 100 μm.

4. The mixed-fiber nonwoven fabric according to claim 1, wherein the number of the low melting point fibers is 50 to 5,000 times the number of the high melting point fibers.

5. The mixed-fiber nonwoven fabric according to claim 1, which is a charged nonwoven fabric.

6. A laminated sheet comprising at least one layer of the mixed-fiber nonwoven fabric according to claim 1.

7. A filter comprising the mixed-fiber nonwoven fabric according to claim 1.

8. A filter comprising the laminated sheet according to claim 6.

9. A process for producing a mixed-fiber nonwoven fabric,
   the process comprising extruding a polyolefin resin component A and a high melting point resin component B having different melting points from separate holes provided on a single die to form fibers, and mixing the resulting fibers, and
   the process being performed with the conditions where the high melting point resin component B has a higher melting point than the melting point of the polyolefin resin component A,
   the high melting point resin component B has a higher melt viscosity than the melt viscosity of the polyolefin resin component A at a spinning temperature employed in the production process, and
   the fibers made from the polyolefin resin component A are spun at an apparent spinning speed which is 20 to 500 times the apparent spinning speed of the fibers made from the high melting point resin component B.

10. The mixed-fiber nonwoven fabric according to claim 1, wherein the mixed-fiber nonwoven fabric is obtained by a melt-blowing process which uses a single die having a structure in which different types of resins are extruded from separate holes arranged in a row.

\* \* \* \* \*